United States Patent
Jones

[15] 3,705,290
[45] Dec. 5, 1972

[54] ELECTRICAL GAS HEATING APPARATUS USING FREQUENCY MULTIPLYING CIRCUIT AND INDUCTION BLOWER

[72] Inventor: Clive Lynn Jones, Swansea, Wales

[73] Assignee: National Research Development Corporation, London, England

[22] Filed: April 12, 1971

[21] Appl. No.: 133,123

Related U.S. Application Data

[62] Division of Ser. No. 829,920, June 3, 1969, Pat. No. 3,611,434.

[30] Foreign Application Priority Data

June 7, 1968 Great Britain.....,.................27,259/68
Jan. 2, 1969 Great Britain.....;.....................325/69

[52] U.S. Cl.....................219/364, 321/47, 321/69 R
[51] Int. Cl.............................H05b 3/00, F24h 3/04
[58] Field of Search...............219/364; 321/47, 69 R

[56] References Cited

UNITED STATES PATENTS

| | | | |
|---|---|---|---|
| 2,420,213 | 5/1947 | Walker | 321/69 R |
| 3,497,675 | 2/1970 | Yoshiike | 219/364 |
| 3,575,583 | 4/1971 | Brown | 219/364 |
| 2,946,963 | 7/1960 | Lee | 321/69 R |
| 3,044,004 | 7/1962 | Sicard | 321/69 R |
| 3,525,851 | 8/1970 | Seabury, Jr. | 219/364 X |

*Primary Examiner*—William M. Shoop, Jr.
*Attorney*—Cushman, Darby & Cushman

[57] ABSTRACT

An electric motor is fed through a frequency multiplying circuit formed by a rectifying circuit with a bypass circuit connected across the motor for removing the DC component of the rectified current so that the motor is fed with an AC current having a higher frequency than that of the supply, the motor being mechanically coupled to drive a gas blower and the bypass circuit comprising a heater in the gas path through the blower.

6 Claims, 23 Drawing Figures

PATENTED DEC 5 1972
3,705,290
SHEET 1 OF 9
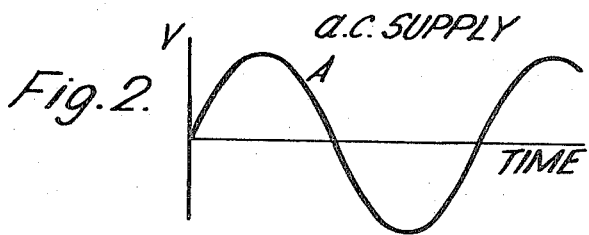
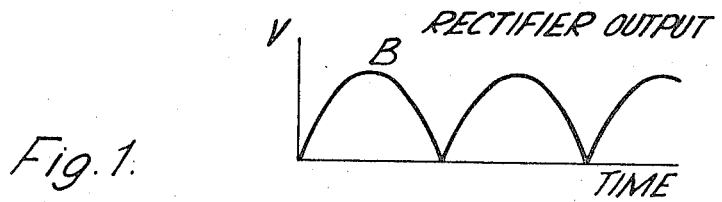
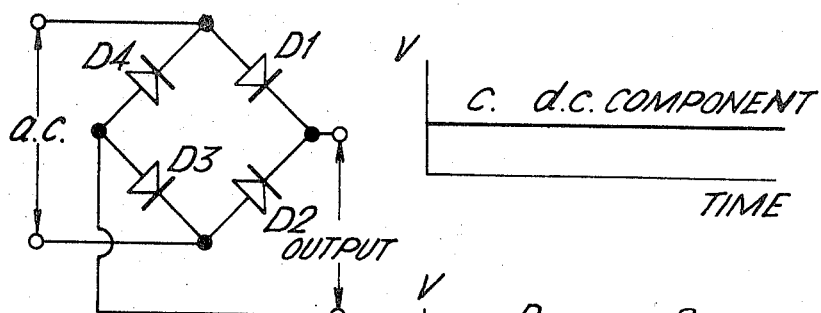
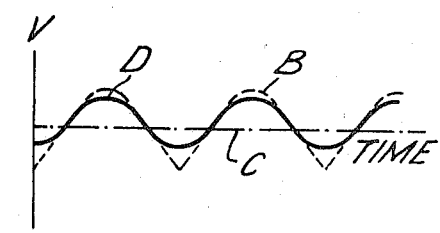
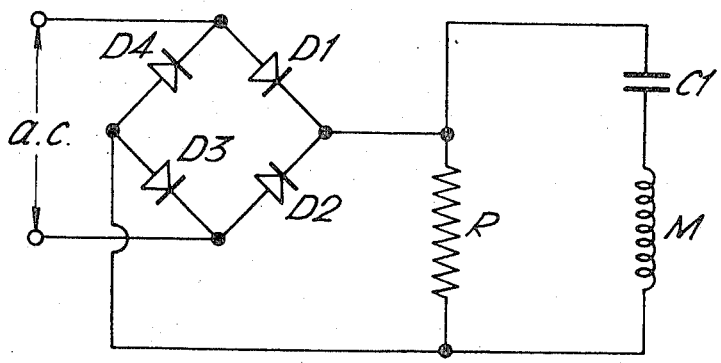
INVENTOR
CLIVE LYNN JONES
BY
Cushman, Darby & Cushman
ATTORNEYS

ELECTRICAL GAS HEATING APPARATUS USING FREQUENCY MULTIPLYING CIRCUIT AND INDUCTION BLOWER

This is a division of my earlier U.S. application Ser. No. 829,920 filed June 3, 1969 now issued U.S. Pat. No. 3,611,434 issued Oct. 5, 1971.

BACKGROUND OF INVENTION

A great advantage of cage type or squirrel cage induction motors over other types of electric motor is their cheapness and ruggedness, due principally to the absence of any rubbing contacts or insulated windings on the motor.

One limitation of such motors is that the highest speed at which they can be driven as a motor is, in the case of a single phase two pole motor, approximately equal to the frequency of the alternating voltage supplied to the stator windings.

The main object of the invention is to provide a frequency multiplying circuit which may be used to increase the speed of an induction motor relative to the supply frequency using relatively simple apparatus.

SUMMARY OF INVENTION

According to one aspect the invention comprises a frequency multiplying electrical circuit including a whole wave rectifier circuit adapted to be fed from an A C supply and capacitively coupled to a load circuit to feed rectified current thereto, together with a resistive bypass circuit connected to bypass the D C component of the rectified current from the load circuit and the arrangement being such that the frequency of the output from the rectifier circuit is a multiple of the input.

According to another aspect the invention comprises a polyphase rectifier circuit adapted to be fed from a polyphase supply and having the outputs connected in parallel to a single phase load so that the load is fed from the individual phase circuits sequentially, together with a resistive bypass circuit connected across the load to bypass the D C component of the rectified currents.

In applying the invention to an induction motor the induction motor stator will constitute the load.

It will be appreciated that in the case of a single phase supply using a whole wave rectifier the frequency of the A C voltage fed to the load will be double the frequency of the A C supply to the rectifier.

In the case of a three-phase supply the frequency of the voltage fed to the load will be three times the frequency of the A C supply using half-wave phase rectifiers or using full-wave rectifiers, the voltage fed to the load will be at six times the frequency of the A C supply.

Preferably the rectifiers are solid state rectifiers.

Preferably the bypass circuit has a high inductance so as to block the A C component of the rectified current. The bypass circuit must, of course, be resistive and capable of dissipating the energy of the D C component of the current output from the rectifier.

According to a further feature the control apparatus is arranged to vary the frequency of the output current. In cases in which the supply feeds an induction motor such control apparatus provides a speed control for the motor.

According to one embodiment switching apparatus is provided whereby the whole wave rectifier circuit may be converted at will to a half-wave rectifier circuit so as to halve the frequency of the A C output. Such a control would of course enable a motor to be run at half speed.

According to another embodiment means are provided for varying the proportions of current which flow through the load and the bypass circuit. Such a control may be provided by a variable resistance in series with the load or alternatively in series with the bypass circuit, if desired the bypass circuit may consist of a variable resistance. In other cases variable resistances may be provided both in the load circuit and also in the bypass circuit and these may be ganged.

In the case of a polyphase circuit switching means may be provided for converting a polyphase circuit to a single phase circuit.

An important application of the invention is in fan heaters, such for example as hair driers in which the energy of the D C component can be usefully dissipated in the heater.

In order that the invention may be more clearly understood reference will now be made to the accompanying drawings, in which:

FIG. 1 shows a well-known single phase bridge rectifier.

FIG. 2 shows graphically the currents arising in the rectifier of FIG. 1.

FIG. 3 shows a single phase induction motor fed through a frequency multiplying circuit embodying the invention.

Figure 4:
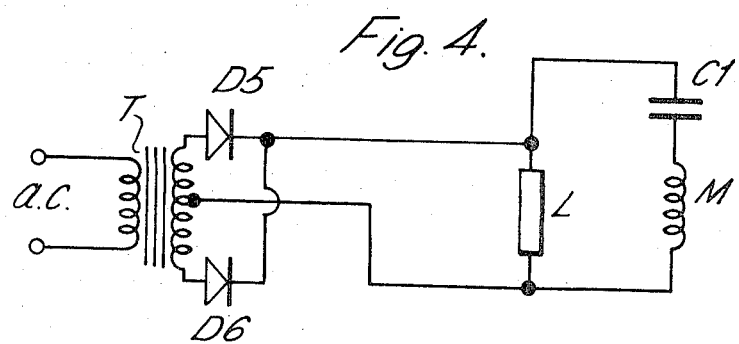
FIG. 4 shows an alternative arrangement to that shown in FIG. 3.
Figure 11:
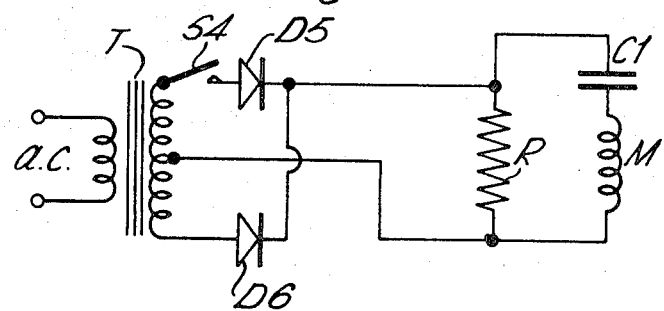

FIG. 11 corresponds to FIG. 4 modified to provide two output frequencies.

Figure 12:
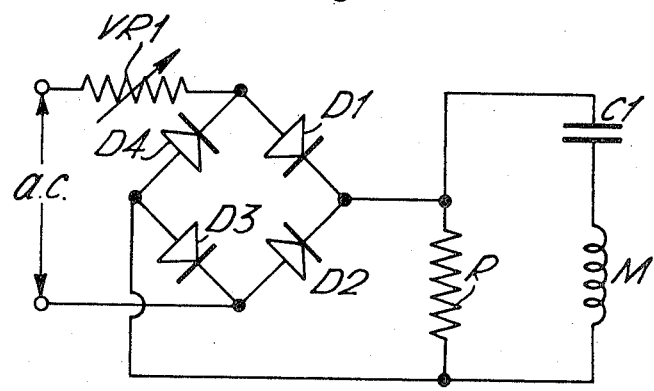

FIG. 12 shows FIG. 4 modified to provide a variable input voltage and hence a continuous variation of speed of an induction motor.

Figure 13:
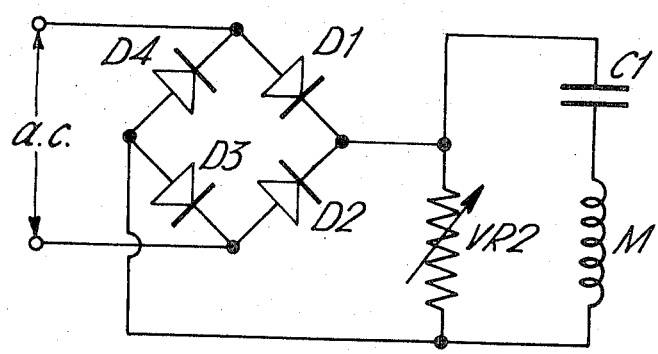

FIG. 13 shows how the speed of an induction motor may be varied by varying the proportions of current passing through the motor and bypass circuit.

Figure 14:
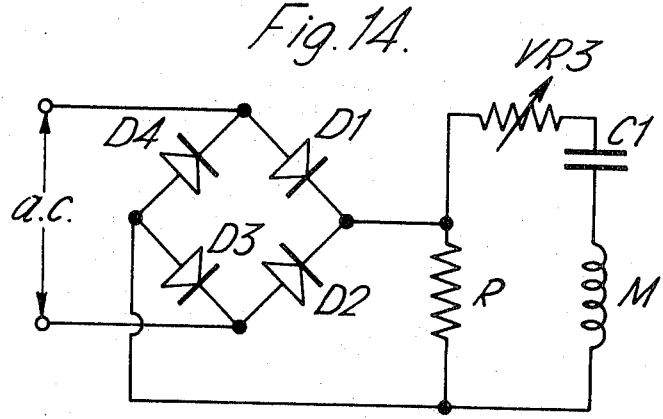

FIG. 14 shows an arrangement alternative to FIG. 13.

Figure 15:
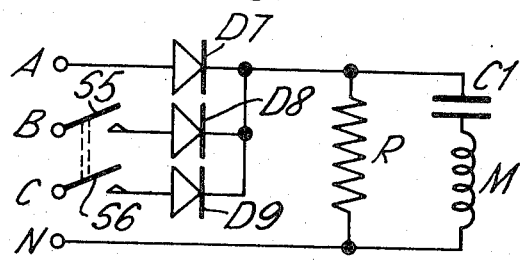

FIG. 15 shows an arrangement for switching a three phase half-wave rectifying circuit from three phase to single phase.

Figure 16:
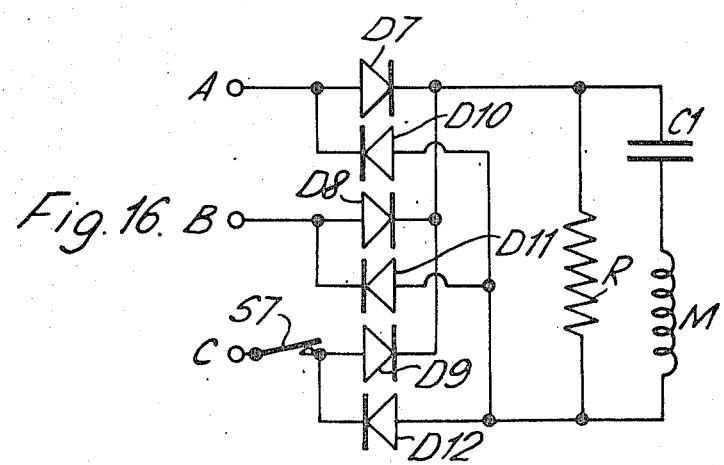

FIG. 16 shows a corresponding switching arrangement for a three-phase whole wave rectifying circuit.

Figure 17:
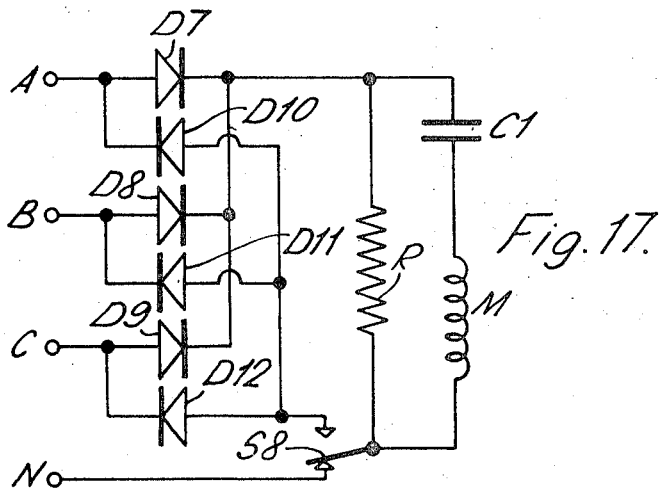
Figure 18:
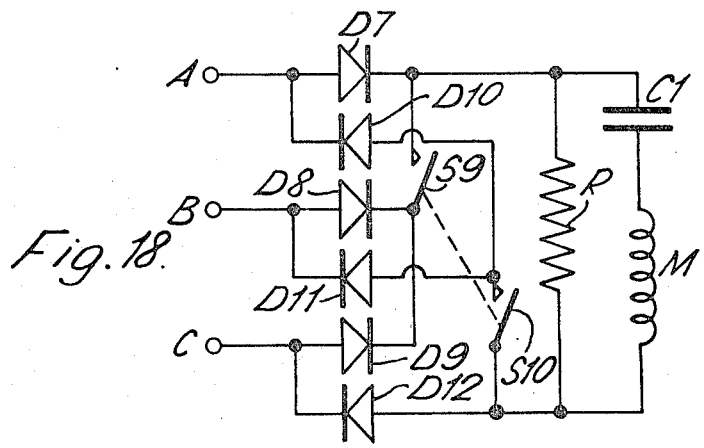

FIG. 17 shows a circuit for switching a three phase whole wave rectifying circuit to three-phase half-wave, and FIG. 18 shows an arrangement for switching a three-phase whole wave rectifying circuit to a single phase half-wave circuit.

Figure 19:
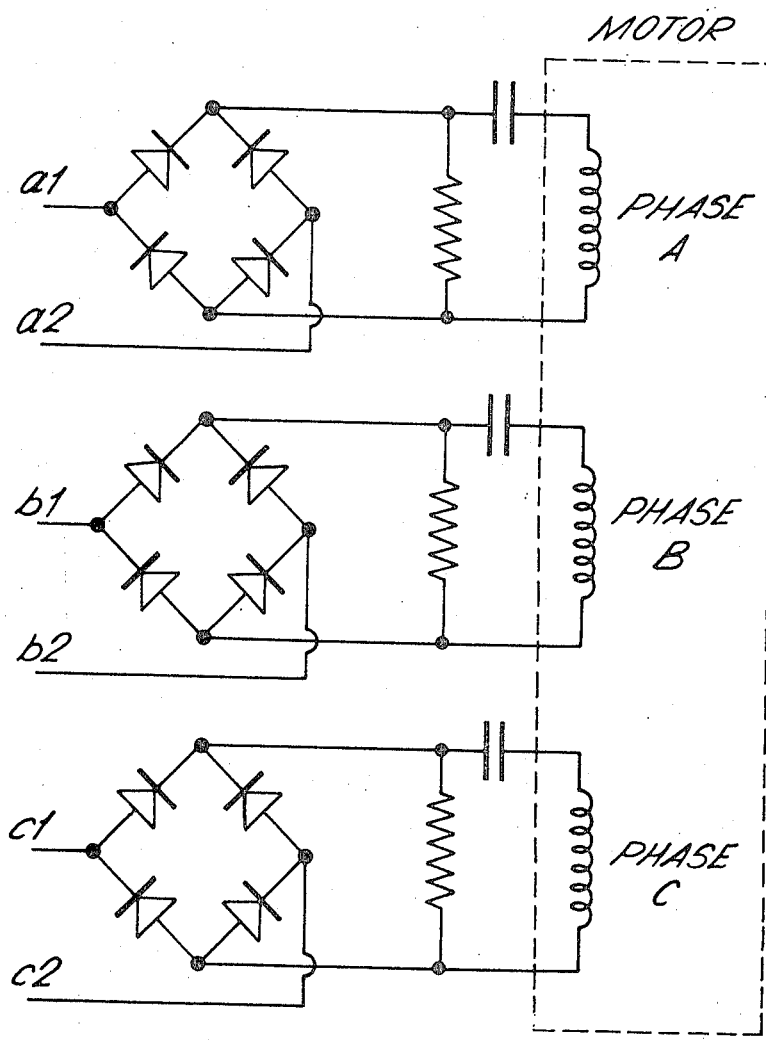

FIG. 19 shows an arrangement in which a three-phase supply is fed to a three-phase load.

Figure 20:
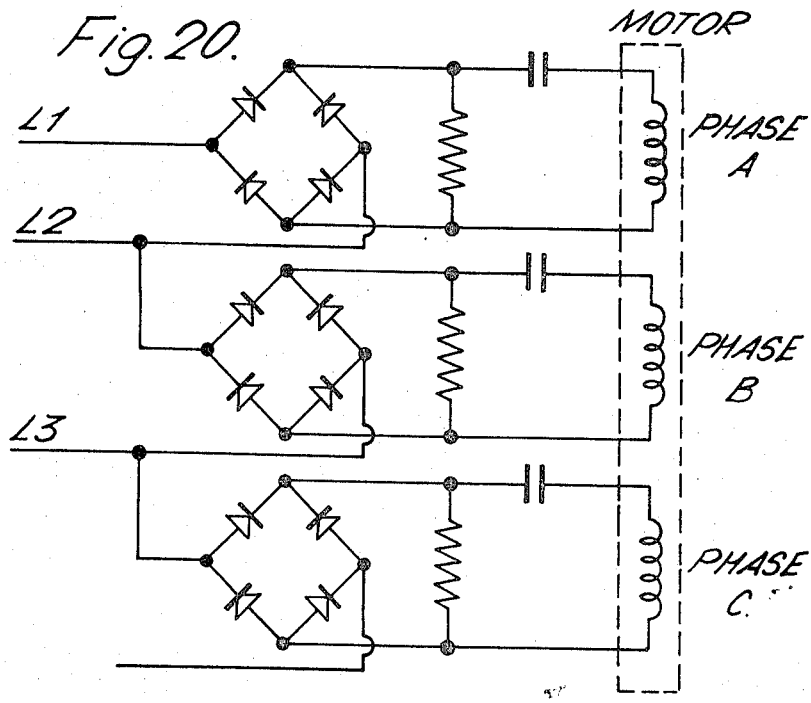
Figure 21:
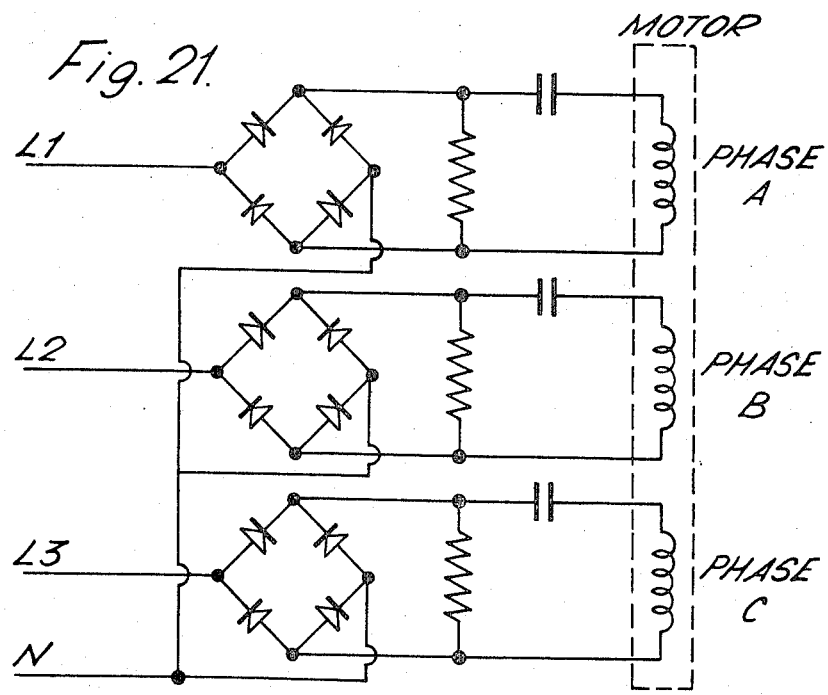

FIG. 20 shows the arrangement of FIG. 19 in which the load is delta connected, and FIG. 21 shows an alternative arrangement in which the load is star connected.

Figure 22:
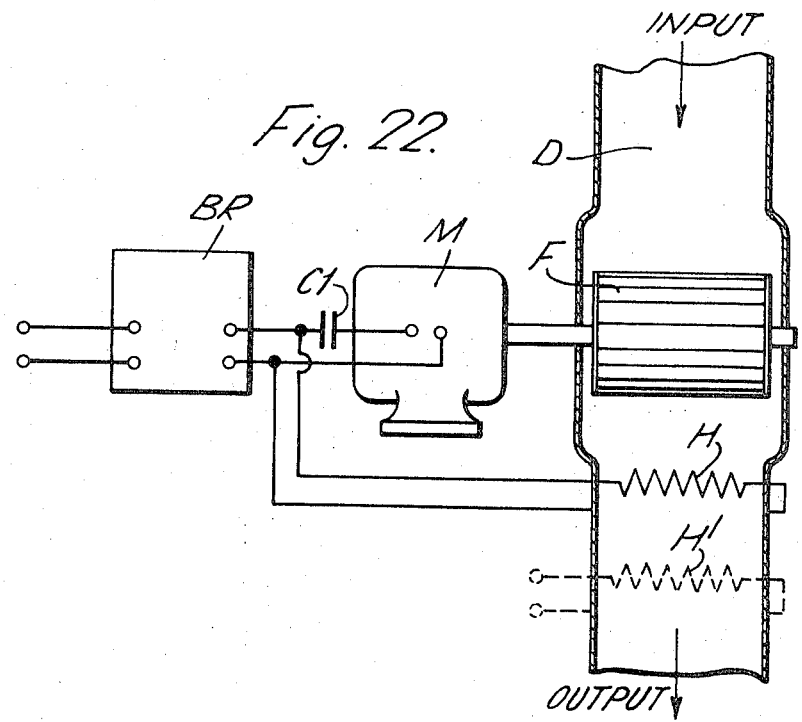
Figure 23:
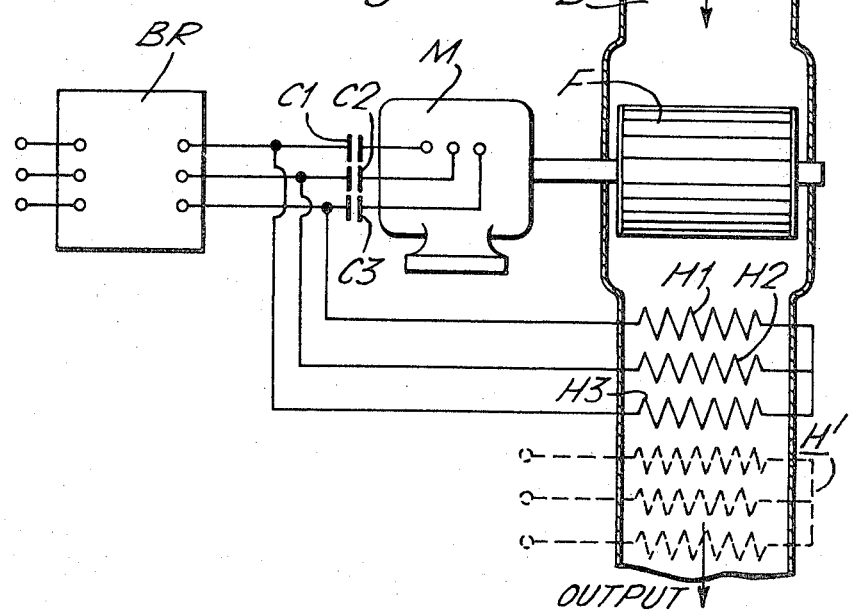

FIG. 22 is an explanatory view showing how the invention can be applied to a fan heater using a single phase A C driving motor, and FIG. 23 is a similar view but showing an arrangement in which the fan heater is driven by a three-phase A C motor.

FIG. 1 shows a well known bridge rectifier circuit comprising four rectifiers D1, D2, D3 and D4, the A C input is applied across the junctions between the rectifiers D4 and D1 and the junction between the rectifiers D3 and D2.

The D C output is taken from the junction between D3 and D4 and the junction between D1 and D2.

Referring now to the graphs shown in FIG. 2, waveform S is the A C supply to the bridge rectifier. Waveform B is the output from the bridge rectifier. This may be shown to comprise a D C component and an A C component. The D C component C is shown in the third graph whilst the last graph shows how the A C component D may be obtained by subtracting the waveform C from the waveform B. It will clearly be seen that the waveform D is double the frequency of the supply waveform A.

FIG. 3 shows how this rectifier circuit may be used to double the frequency fed to a motor M. In this case the induction motor M is fed from the output of the rectifier circuit through a capacitive coupling C1 whilst a bypass circuit R removes the D C component from the current fed to the motor M. It will readily be seen that with this arrangement the motor M is fed with A C at a frequency double that of the A C supply fed to the bridge rectifier. By such an arrangement it is possible to design the motor to run at speeds twice the frequency of the A C supply, assuming of course that the motor winding has a single pair of poles and that suitable starting arrangements, well known in the art, are provided.

FIG. 4 shows an alternative arrangement to the bridge rectifier of FIG. 3 in which the single phase A C supply is fed through a transformer T having a center-tapped secondary winding feeding a bi-phase rectifier formed by the individual rectifiers D5 and D6, L being the bypass circuit for the D C component.

Figure 5:
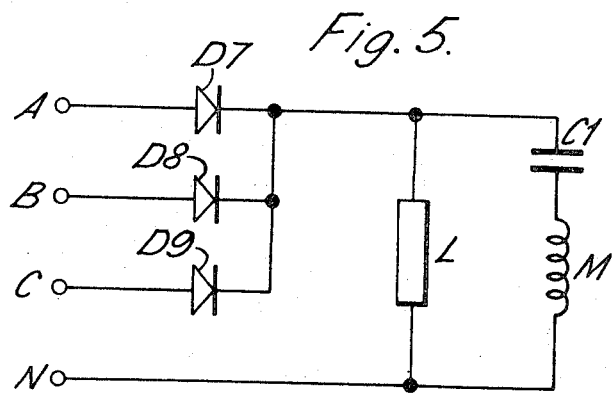
FIG. 5 shows a motor as fed from a three phase supply.

FIG. 5 shows an induction motor fed from a three-phase supply. In this arrangement each of the three-phase lines A, B, C is fed to one side of the motor through a respective half-wave rectifier D7, D8 and D9 and a common condenser C1, whilst the other side of the motor is connected to a common neutral line N.

Figure 6:
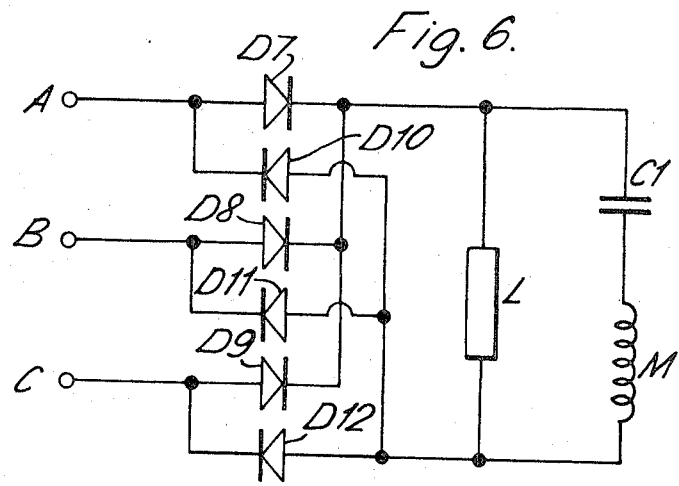
FIG. 6 shows the three-phase circuit of FIG. 5 modified to double the frequency, i.e., to give an output frequency six times the frequency of the supply.

FIG. 6 shows a modification of the arrangement of FIG. 5 in which the phase lines are fed through whole wave rectifiers and the common neutral line is dispensed with. Thus the rectifiers D7, D8 and D9 are connected to the upper side of the motor winding M through a capacitor C1 whilst the rectifiers D10, D11 and D12 are connected to the lower side of the motor winding M. Such arrangements enable the motor to be driven at six times the frequency of the A C supply, assuming of course that the motor stator winding has a single pair of poles.

It will readily be appreciated that the arrangements above shown provide a simple and cheap method of increasing the speed of a motor and the invention has numerous applications in small motor drives where the cost of the heat dissipated in the bypass resistor is negligible, for example, in fan heaters, hair driers and the like. In the case of fan heaters the heat dissipated in the bypass circuit may be usefully employed for heating purposes.

In some cases the rectifiers may be controlled rectifiers, e.g., thyristors, which could be arranged to provide a degree of speed control.

It is also possible to cascade the rectifier circuits but in such a case the current output would be considerably reduced and hence would only be useful for quite small load currents.

Figure 7:
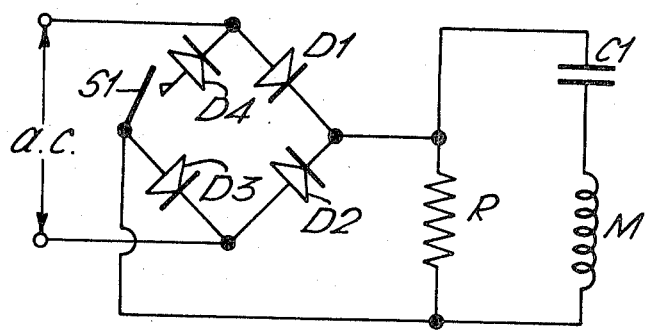
FIG. 7 shows the frequency changing supply circuit which corresponds to FIG. 3 but modified to provide two alternative frequencies.
Figure 8:
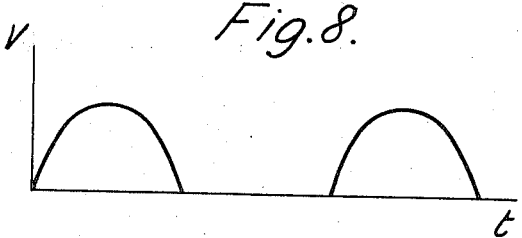
FIG. 8 shows the voltage waveform obtainable with FIG. 7.

FIG. 7 shows an arrangement corresponding to FIG. 3 but with the addition of the switch S1. When the switch S1 is closed the circuit operates normally as a whole wave rectifying circuit and the output frequency is double the input frequency. When, however, the switch S1 is opened the circuit becomes a half-wave rectifying circuit and the output frequency is the same as the input frequency as shown graphically in FIG. 8.

Figure 9:
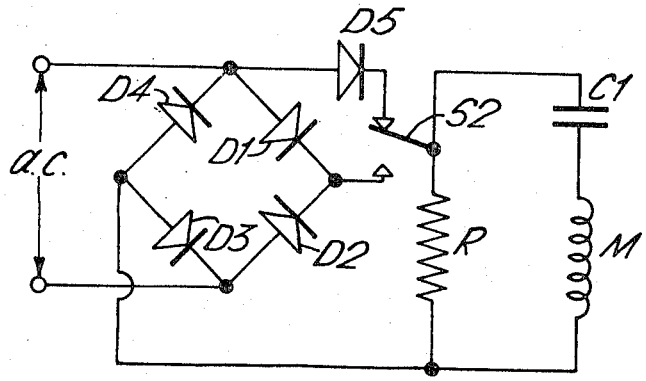
FIG. 9 shows an alternative arrangement to FIG. 7.

FIG. 9 shows an alternative arrangement in which a two-way switch S2 and an additional rectifier are added. In the position shown, with the switch moved to its upper position, the upper end of the by-pass circuit R is connected to the junction of D1 and D4 and the circuit acts as a half-wave rectifier, with the input and output frequencies the same. When the switch S2 is moved over to the lower position however, the circuit reverts to its normal full-wave rectifying state and the output frequency is double the input frequency. It will be noted that in the first position the only operative rectifiers are D5 and D3 in series.

Figure 10:
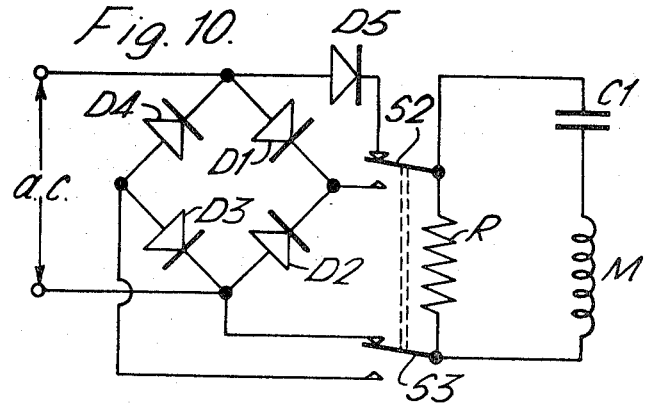
FIG. 10 shows another arrangement using a two pole switch.

FIG. 10 shows a modification of the arrangement of FIG. 9 in which second two-way switch S3 is added; this switch is ganged with S2 and cuts out the rectifier D3 in the half-wave position so that only the rectifier D5 is operative.

FIG. 11 shows FIG. 5 modified by the addition of a switch S4. When the switch S4 is closed the circuit operates normally to give frequency doubling, but when the switch S4 is opened the output frequency is the same as the input.

FIG. 12 shows the arrangement of FIG. 3 in which a variable resistance VR1 is inserted in the input circuit. Such an arrangement can be used for varying the speed of an induction motor fed by the circuit.

FIG. 13 shows a modification of the same Figure in which the bypass circuit is formed by a variable resistance VR2, this permits control of the proportion of current flowing through the bypass circuit and control of the speed of an induction motor.

FIG. 14 shows an alternative arrangement to FIG. 13 in which a variable resistance VR3 is inserted in the motor circuit in place of the variable resistance VR2.

Clearly the arrangements of FIGS. 13 and 14 could be combined and both resistances VR2 and VR3 employed in which case the two variable resistances would be ganged.

FIG. 15 corresponds to FIG. 5 and shows a three-phase half-wave rectifier arrangement in which ganged switches S5 and D6 are added. When the switches are closed the circuit acts normally and all three phases are operative; when, however, the switches are opened, phases B and C are cut out and the circuit acts as a single phase circuit. In the case of an induction motor this will give a speed reduction to one-third of the previous speed.

FIG. 16 corresponds to FIG. 6 with the addition of the switch S7, when the switch is closed the circuit acts normally, i.e., as a three-phase whole wave rectifier giving a frequency multiplication of six times, when the switch S7 is opened the circuit changes to a single phase whole wave rectifier, giving a frequency multiplication of four.

FIG. 17 shows an alternative arrangement to FIG. 16 in which the switch S7 is replaced by the switch S8 in the neutral line. When this switch is in the upper position the circuit acts normally, i.e., as a three-phase whole wave rectifier, when the switch is in the lower position the circuit acts as a single phase half-wave rectifier with a frequency on-sixth of that obtained with the former arrangement.

FIG. 18 shows another arrangement in which two ganged switchs S9 and S10 are employed; this produces the same result, i.e., with the switches in the closed position the circuit acts normally as a three-phase whole wave rectifier with a frequency multiplication of six, with the switch in the open position; however, the circuit acts as a single phase half-wave rectifier circuit, with the output frequency the same as the frequency of the supply.

It will be appreciated that the variable resistances shown in FIGS. 12, 13 and 14 may be used in any of the other arrangements employing switching to give additional speed control in the case of the circuit supplying an induction motor.

FIG. 19 shows a further arrangement in which a three-phase supply is fed to a three-phase load shown as the stator of a squirrel cage induction motor. Each individual phase circuit includes a whole wave rectifier and resistive bypass circuit, arranged as shown in FIG. 3.

Switching to vary the speed can be included, for instance, in accordance with the arrangements shown in FIGS. 7 or 9, the switches for the phases being ganged.

FIG. 20 shows a modification of the arrangement of FIG. 19 in which the load is delta connected, a neutral line is not required in this arrangement, and FIG. 21 shows the alternative arrangement in which the load is star connected, a neutral line being employed with this arrangement.

As mentioned above the invention is applicable to fan heaters and FIG. 22 shows an example of such an arrangement in which a rectifier circuit BR, which may be any one of the single phase bridge rectifiers shown in earlier figures or the three-phase arrangement of FIG. 5, feeds a single phase motor M mechanically coupled to drive a fan blower F, located in a gas supply duct D.

The output from the rectifier circuit is connected both to the motor and also to a heater H which constitutes the bypass circuit above described, and which is located in the duct D so as to heat the gas passing through it. In this way the heat developed in the bypass heater H is usefully dissipated.

In some cases additional heat may be required and in such cases an additional heater H', heated directly from the supply may be provided in the duct.

FIG. 23 shows a corresponding arrangement using a three-phase motor, in this arrangement the rectifier circuit BR' could be any of the three-phase circuits above described.

In this arrangement three heaters H1, H2 and H3 are shown, these act as bypass circuits from the respective phases. The heaters are shown connected in star, they could of course be connected in delta or the phases kept in separate circuits.

As in the arrangement of FIG. 22 an additional heater H' fed directly from the mains may be provided if additional heat is required. Clearly the circuits could be modified for six phases if required.

Apparatus such as shown in FIGS. 22 and 23 may be used for a variety of purposes, for example in space heaters for industrial or domestic heating systems, in fan hair driers and clothes driers and in other applications in which a flow of heated gas is required.

I claim:

1. A frequency multiplying circuit in combination with an electrical induction motor and gas heating apparatus comprising:
    a whole wave rectifier circuit arranged to be fed from a polyphase alternating current supply,
    a load circuit comprising a polyphase cage type induction motor,
    capacitive A C coupling means connected between outputs of the rectifier circuit and corresponding phases of the motor stator winding of the load,
    at least one resistive bypass circuit comprising electric heaters connected across the corresponding output phases of the rectifier circuit to bypass the direct current components of the rectified current from the load, and
    a gas blow device mechanically connected to the motor to be driven thereby and disposed to cause a gas flow through said electric heaters thereby providing a flow of heated gas.

2. A frequency multiplying circuit in combination with an electrical induction motor and gas heating apparatus comprising:
    a whole wave polyphase rectifier circuit arranged to be fed from a polyphase alternating current electric supply,
    a load circuit comprising a polyphase cage type induction motor,
    capacitive A C coupling means connected between the output of the rectifier circuit and the load,
    at least one resistive bypass circuit comprising an electric heater means connected across the output of the rectifier circuit to bypass the direct current components of the rectified current away from the load, and
    a gas blower device mechanically connected to the motor to be driven thereby,
    said electric heater means being disposed in the gas flow through the blower.

3. A frequency multiplying circuit in combination with an electrical induction motor and gas heating apparatus, said combination comprising:
    a rectifier circuit means having an input for connection to an alternating current supply and an output for providing rectified current,
    a load circuit including said induction motor,
    capacitive A C coupling means connected between the output of said rectifier circuit and said motor for passing the alternating current component of said rectified current to said motor, at least one resistive bypass circuit connected across the output of said rectified circuit for bypassing the direct current component of said rectified current away from said motor, and a fan blower mechanically coupled to said motor for blowing gas, said resistive bypass circuit including at least one electrical heater element in the path of the gas flowing through said fan blower for heating said gas.

4. Apparatus comprising a frequency multiplying electrical circuit in combination with an electric induction motor and a gas heating device, said apparatus including:

a rectifier circuit adapted to be fed from an A C electric source, a capacitive A C coupling connected between an output of the rectifier circuit and the motor for supplying successive half waves of rectified current to the motor so as to feed the motor with an A C current having a frequency which is a multiple of the frequency of the A C electric source, a fan blower driven by said motor, and a heater for the gas flow through said blower, said heater being electrically connected across the rectifier circuit output so as to form a bypass circuit around the motor for the D C component of the rectified current.

5. Apparatus as claimed in claim 4 wherein said rectifier circuit comprises a single phase whole wave rectifier, and connections are provided between the rectifier and the motor for feeding the motor with a current having a frequency double the frequency of the A C electric source.

6. Apparatus as claimed in claim 4 wherein;

said rectifier circuit is a polyphase rectifier adapted to be fed from a polyphase A C electric source and said induction motor has a polyphase winding.

* * * * *